(12) United States Patent
Holgerson et al.

(10) Patent No.: US 11,395,463 B2
(45) Date of Patent: Jul. 26, 2022

(54) GREENHOUSE SCREEN

(71) Applicant: AB Ludvig Svensson, Kinna (SE)

(72) Inventors: Per Holgerson, Brämhult (SE); Daniel Asplund, Landvetter (SE)

(73) Assignee: AB Ludvig Svensson, Kinna (SE)

( * ) Notice: Subject to any disclaimer, the term of this patent is extended or adjusted under 35 U.S.C. 154(b) by 1066 days.

(21) Appl. No.: 16/066,140

(22) PCT Filed: Jan. 20, 2017

(86) PCT No.: PCT/EP2017/051231
§ 371 (c)(1),
(2) Date: Jun. 26, 2018

(87) PCT Pub. No.: WO2017/125575
PCT Pub. Date: Jul. 27, 2017

(65) Prior Publication Data
US 2020/0163284 A1    May 28, 2020

(30) Foreign Application Priority Data

Jan. 22, 2016    (SE) .................................... 1650077-9

(51) Int. Cl.
*B32B 27/36*    (2006.01)
*D04B 21/20*    (2006.01)
(Continued)

(52) U.S. Cl.
CPC .............. *A01G 9/1438* (2013.01); *B32B 7/08* (2013.01); *B32B 27/36* (2013.01); *D04B 21/202* (2013.01);
(Continued)

(58) Field of Classification Search
CPC ..... B32B 27/00; B32B 27/36; B32B 2307/71; B32B 2410/00; C08J 5/18; C08K 3/36;
(Continued)

(56) References Cited

U.S. PATENT DOCUMENTS 3,941,752 A    3/1976    Kleiner et al.
4,170,087 A    10/1979    Tapia
(Continued)

FOREIGN PATENT DOCUMENTS

CN    1060660 A    4/1992
CN    1809764 A    7/2006
(Continued)

OTHER PUBLICATIONS

International Search Report and Written Opinion for corresponding International Application No. PCT/EP2017/051236 dated Mar. 10, 2017.
(Continued)

*Primary Examiner* — Jeremy R Pierce
*Assistant Examiner* — Christine X Nisula
(74) *Attorney, Agent, or Firm* — Renner, Otto, Boisselle & Sklar, LLP

(57) ABSTRACT

A greenhouse screen comprising strips of film material that are interconnected by a yarn system of transverse threads and longitudinal threads by means of knitting, warp-knitting or weaving process to form a continuous product is disclosed. At least some of the strips comprise a film material in the form of a single- or multilayer polyester film wherein the film contains at least 1.0 wt.-% $SiO_2$ and a maximum of 2.5 wt.-% $SiO_2$, and has a spreading factor of at least 2 and not more than 8. The greenhouse screen as disclosed herein has a reduced flammability and light scattering properties particularly suited for greenhouse applications.

20 Claims, 2 Drawing Sheets

(51) Int. Cl.
*A01G 9/14* (2006.01)
*B32B 7/08* (2019.01)
*B32B 5/06* (2006.01)
*B32B 5/26* (2006.01)

(52) U.S. Cl.
CPC ............... *A01G 2009/1453* (2013.01); *A01G 2009/1461* (2013.01); *B32B 5/06* (2013.01); *B32B 5/26* (2013.01); *B32B 2307/3065* (2013.01); *B32B 2307/412* (2013.01); *B32B 2307/71* (2013.01); *B32B 2307/734* (2013.01); *B32B 2410/00* (2013.01); *Y02A 40/25* (2018.01)

(58) Field of Classification Search
CPC ..... C08K 3/34; Y10T 428/25; Y10T 428/259; A01G 2009/1453
See application file for complete search history.

(56) References Cited

U.S. PATENT DOCUMENTS

| | | | |
|---|---|---|---|
| 4,978,181 | A | 12/1990 | Inanuma et al. |
| 5,256,473 | A | 10/1993 | Kotani et al. |
| 5,288,545 | A | 2/1994 | De Decker |
| 9,167,754 | B2 | 10/2015 | Andersson et al. |
| 2002/0068159 | A1 | 6/2002 | Peiffer et al. |
| 2003/0108755 | A1* | 6/2003 | Murschall ............... C08L 67/02 428/480 |
| 2006/0008638 | A1 | 1/2006 | Kiehne et al. |
| 2006/0057343 | A1* | 3/2006 | Tsuji ................. A01G 13/0231 428/212 |
| 2006/0134382 | A1* | 6/2006 | Jesberger ................ C08J 5/18 428/141 |
| 2006/0269724 | A1 | 11/2006 | Ohashi et al. |
| 2010/0221476 | A1 | 9/2010 | Kojima et al. |
| 2011/0192552 | A1 | 8/2011 | Kliesch et al. |
| 2014/0162051 | A1* | 6/2014 | Jesberger ................ B32B 27/36 428/327 |
| 2015/0059239 | A1 | 3/2015 | Andersson et al. |
| 2017/0298212 | A1* | 10/2017 | LaFleur ............... A01G 9/1438 |

FOREIGN PATENT DOCUMENTS

| | | |
|---|---|---|
| CN | 103832035 A | 6/2014 |
| DE | 23 46 787 A1 | 3/1975 |
| DE | 697 31 750 T2 | 2/2006 |
| EP | 0 109 951 A1 | 5/1984 |
| EP | 0 144 948 A1 | 12/1984 |
| EP | 0 769 540 A2 | 4/1997 |
| EP | 1 342 824 A1 | 9/2003 |
| EP | 2531020 A1 | 12/2012 |
| FR | 2 071 064 A5 | 9/1971 |
| JP | 2013-157273 A | 8/2013 |
| JP | 2014-180240 A | 9/2014 |
| WO | 1998/006575 A1 | 2/1998 |
| WO | 2008/091192 A1 | 7/2008 |
| WO | 2011/096882 A1 | 8/2011 |
| WO | 2013/041524 A1 | 3/2013 |
| WO | 2013/117696 A1 | 8/2013 |

OTHER PUBLICATIONS

International Preliminary Report on Patentability for corresponding International Application No. PCT/EP2017/051236 dated Jan. 3, 2018.

* cited by examiner

GREENHOUSE SCREEN

This application is a national phase of International Application No. PCT/EP2017/051231 filed Jan. 20, 2017, and claims priority to Swedish Application No. 1650077-9 filed on Jan. 22, 2016, which is incorporated herein by reference.

TECHNICAL FIELD

The present invention refers to a greenhouse screen of the kind comprising a plurality of flexible strips of film, which are interconnected by a yarn framework by means of knitting, warp-knitting or weaving process to form a continuous product. More specifically the invention further refers to a shade screen that scatters the light to create a more homogeneous light distribution inside the greenhouse and a milder climate for the plants.

BACKGROUND OF THE INVENTION

The aim of protected cultivation in greenhouses is to modify the natural environment to increase yield, to improve product quality, to conserve resources, to extend production areas and crop cycles among others. Depending on the location of the greenhouse and the crop grown therein, the crop needs to be shaded during the full or parts of the year to avoid harmful stress that will lower the production.

Greenhouse screens are frequently used for energy saving, shading and temperature control. The screens must meet a number of requirements. On the one hand it must let pass the portion of the light needed for plant growth but on the other hand it must block harmful light and the unneeded part which would lead to excessive heating of the greenhouse.

One known type of greenhouse screens comprises a plurality of flexible strips of film material extending in parallel and which by means of a knitting, warp-knitting or weaving process and a yarn system are interconnected to form a continuous product, where the strips form a major part of the surface area of the product. Such a greenhouse screen is known for example through EP 0 109 951. Other examples of screens of this type are shown in FR 2 071 064, EP 1 342 824 and in WO 2008/091192.

The strips of film material can be of selected materials providing desired properties with respect to reflection and light and heat transmission.

The traditional method of shading is to apply chalk/whitewash to the cover of the greenhouse. This is a cheap and easy method to apply fixed shading to the greenhouse. The main drawback is that it is always applied, both in the morning and afternoon when a reduction of light is unwanted, and also on cloudy days. An advantage of the chalk is that it diffuses the light passing through it, which gives higher production since more light is reaching the lower leafs of the plant, increasing the photosynthesis. The diffused light also gives a milder climate in the greenhouse, and on days with strong sunshine it will result in lower head temperature of the plants, preventing stress and production losses and quality problems.

Some of the above problems are solved by installing a mobile shade screen, which can be retracted when it is not needed. This has made it a standard item in most high end greenhouses, sometimes in combination with whitewash. There are screens that give good light diffusion, but then only at very high shade levels. Up until now there has been no mobile shade screen that gives good light diffusion also at low shade levels.

SUMMARY OF THE INVENTION

An object of the present invention is to provide a greenhouse screen that scatters the light to create a more homogeneous light distribution inside the greenhouse and a milder climate for the plants. This is provided by a greenhouse screen comprising strips of film material that are interconnected by a yarn system of transverse threads and longitudinal threads by means of knitting, warp-knitting or weaving process to form a continuous product, wherein at least some of the strips comprise a film in the form of a single- or multilayer polyester film which contains at least 1.0 wt.-% $SiO_2$ and a maximum of 2.5 wt.-% $SiO_2$; and has a spreading factor (SF) of at least 2 and not more than 8.

Advantageously said film has a total thickness of at least 10 micrometers and at the most micrometers.

Advantageously said film has three layers, and is composed of one base layer and two outer layers, and at least 75% of the $SiO_2$ particles are in the base layer.

Advantageously the outer layers each contain less than 1.5% of the $SiO_2$ particles.

Advantageously said $SiO_2$ particles have a d50 value of 2-10 micrometers,

Advantageously said film has a transmission of less than 40% in the wavelength range from 370 nm to 300 nm.

Advantageously said film has a standard viscosity (SV) value of at least 700.

Advantageously said film has a haze of 60-95%.

Advantageously said film has a clarity of 15-40%.

Advantageously said film has a transparency of 70-92%.

Advantageously at least all of outer layers contain at least 0.3 wt.-% of an organic UV-stabilizer (based on the weight of the layer).

Advantageously the organic UV-stabilizer is selected from the group consisting of triazines, benzotriazoles or benzoxazinones.

Advantageously the organic UV-stabilizer is 2-(4,6-diphenyl-1,3,5-triazin-2-yl)-5-(hexyl) oxy-phenol (Tinuvin® 1577).

Advantageously UV-stabilizers are added in the respective outer layers in quantities of between 0.3 and 3 wt.-%, based on the weight of the layer into which they are added.

Advantageously white coloring polymers, incompatible with the major component of polyester, is added in an amount of less than 0.3 wt.-% (based on the weight of the film).

Advantageously no layer in said film contains more than 1 wt.-% of calcium carbonate, apatite, other small silica particles with a size <3 micrometers, aluminium oxide, crosslinked polystyrene, crosslinked Poly-methyl-methacrylat (PMMA), zeolite, aluminium silicate, $TiO_2$ or $BaSO_4$ particles (based on the weight of each layer).

Advantageously said film is multilayered and contains at least one outer layer wherein the polyester in this outer layer has an isophthalic acid (IPA) content of 8-23 wt.-% IPA.

Advantageously said film is three layered consisting of a base layer and two outer layers, wherein the polyester in both outer layers has an IPA content from 8-23 wt.-% (based on the weight of each layer).

Advantageously one or more of said strips (11) of film material has a width that is smaller than the distance between the longitudinal threads (13a, 13b; 15; 19).

Advantageously a gap is formed between said one or more strips of film material (11) and the adjacent strip(s), said gap permitting ventilation through said screen.

Advantageously at least 10%, preferably at least 20%, more preferably at least 30%, more preferably at least 40%, more preferably at least 50%, more preferably at least 60%, more preferably at least 70%, more preferably at least 80%, more preferably at least 90% of the strips of film material (11) in the greenhouse screen comprise said single- or multilayer polyester film.

Advantageously all strips of film material (11) in the greenhouse screen are of said single- or multilayer polyester film.

BRIEF DESCRIPTION OF THE DRAWINGS

The invention will below be described with reference to some embodiments shown in the drawings.

DETAILED DESCRIPTION OF PREFERRED EMBODIMENTS

The greenhouse screen 10 according to the invention comprises a plurality of narrow strips of film material 11 held together by a yarn framework 12, 13a, 13b; 14, 15; 18, 19. The strips of film material 11 are preferably arranged closely edge to edge, so that they form a substantially continuous surface. In all embodiments the distance between the strips 11 has been exaggerated for the sake of clarity to make the yarn framework visible. The screen has a longitudinal direction, y, and a transverse direction, x, wherein the strips of film material 11 extend in the longitudinal direction. In some embodiments strips of film material 11' may extend also in the transverse direction. A typical width of the strips is between 2 mm and 10 mm.

Figure 1:
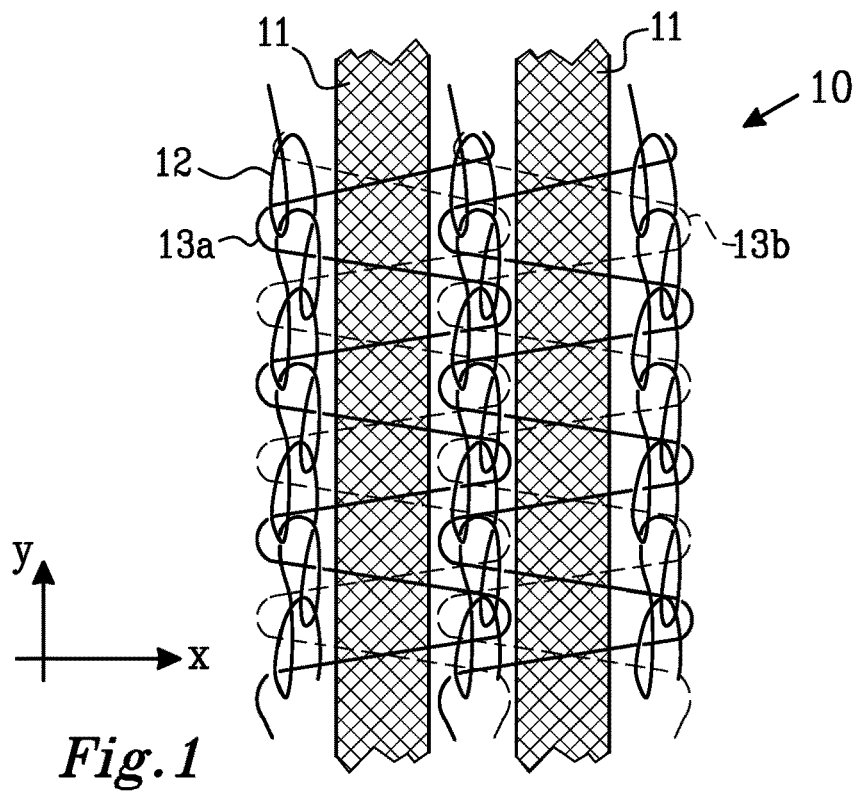
FIG. 1 shows on an enlarged scale part of warp-knitted screen according to a first embodiment.

In FIG. 1 strips of film material 11 are interconnected by a warp knitting procedure as described in EP 0 109 951. The yarn framework comprises warp threads 12 forming loops or stitches and primarily extending in the longitudinal direction, y. The warp threads 12 are connected to one another by weft threads 13a and 13b extending across the film strips.

FIG. 1 shows an example of a mesh pattern for a fabric manufactured through a warp knitting process in which four guide bars are used, one for the strips of film material 11, two for the connecting weft threads 13a and 13b extending transversely to the film strips and one for the longitudinal warp threads 12.

The spaces between the strips of film material 11 have been strongly exaggerated in order to make the mesh pattern clear. Usually the strips of film material 11 are located closely edge to edge. The longitudinal warp threads 12 are arranged on one side of the screen, the underside, while the transverse connecting weft threads 13a and 13b are located on both sides of the fabric, the upper and the underside. The term "transverse" in this respect is not restricted to a direction perpendicular to the longitudinal direction, but means that the connecting weft threads 13a and 13b extends across the strips of film material 11 as illustrated in the drawings. The connection between the longitudinal warp threads 12 and the transverse weft threads 13a and 13b are preferably made on the underside of the fabric. The strips of film material 11 can in this way be arranged closely edge to edge without being restricted by the longitudinal warp threads 12.

The longitudinal warp threads 12 in FIG. 1 extend continuously in unbroken fashion along opposite edges of adjacent strips of film material 11, in a series of knitted stitches, in a so called open pillar stitch formation.

The transverse weft threads 13a and 13b pass above and below the strips of film material 11 at the same location, i.e. opposed to each other, to fixedly trap the strips of film material. Each knitted stitch in the longitudinal warp threads 12 has two such transverse weft threads 13a and 13b engaging with it.

Figure 2:
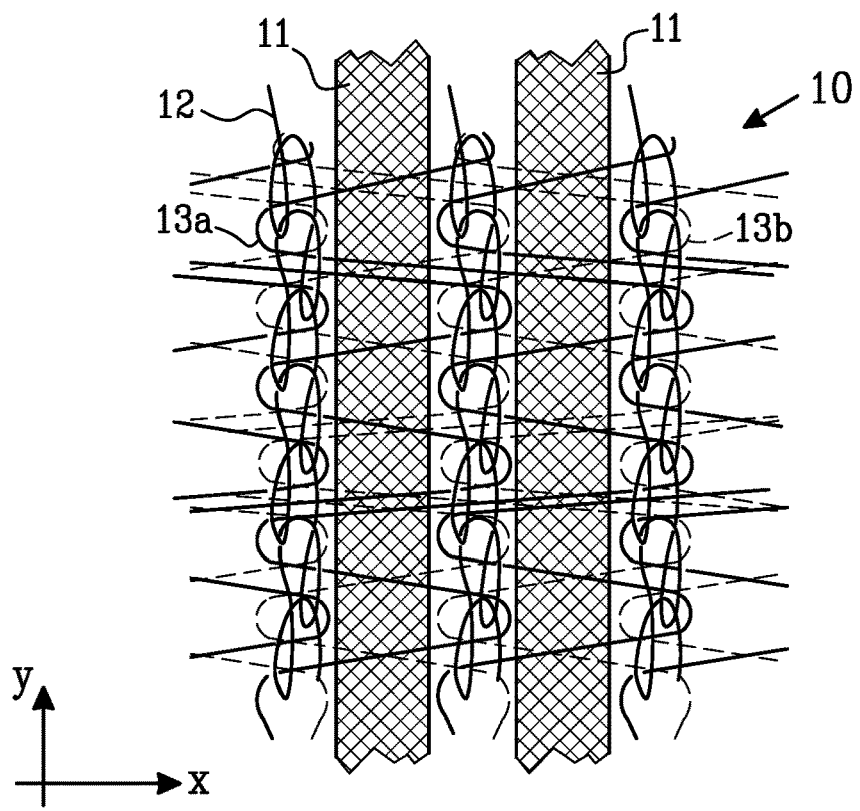
FIG. 2 shows a part of a warp-knitted screen according to a second embodiment.

FIG. 2 shows another example of a mesh pattern for a fabric similar to the one shown in FIG. 1. The difference is that the transverse weft threads 13a and 13b pass over one and two strips of film material 11 in an alternating way.

Figure 3:
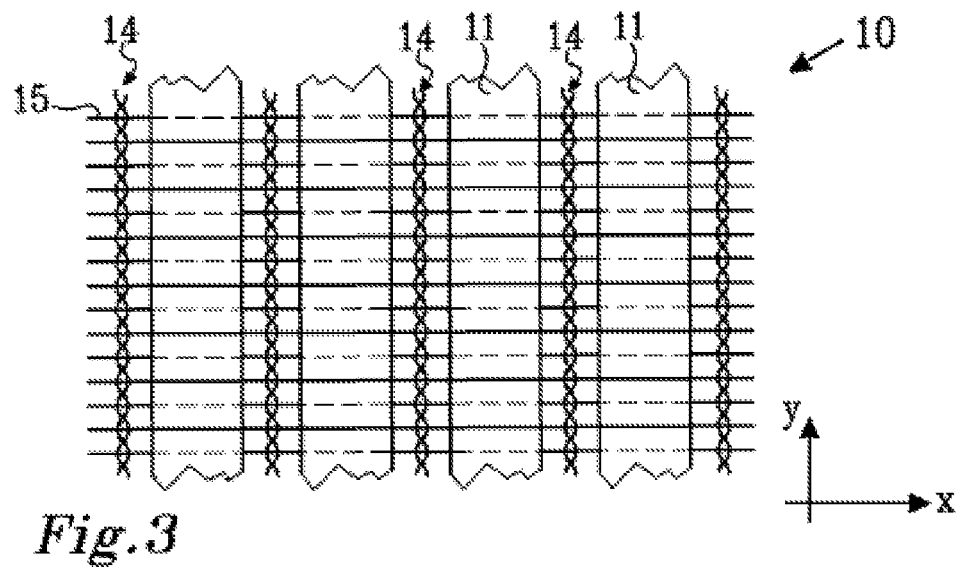
FIG. 3 shows on an enlarged scale a part of a woven screen.

FIG. 3 shows a woven screen in which the strips of film material 11 are interconnected by warp threads 14 extending in longitudinal direction, y, and interwoven with weft threads 15 extending across the strips of film material 11 primarily in the transverse direction, x.

Figure 4:
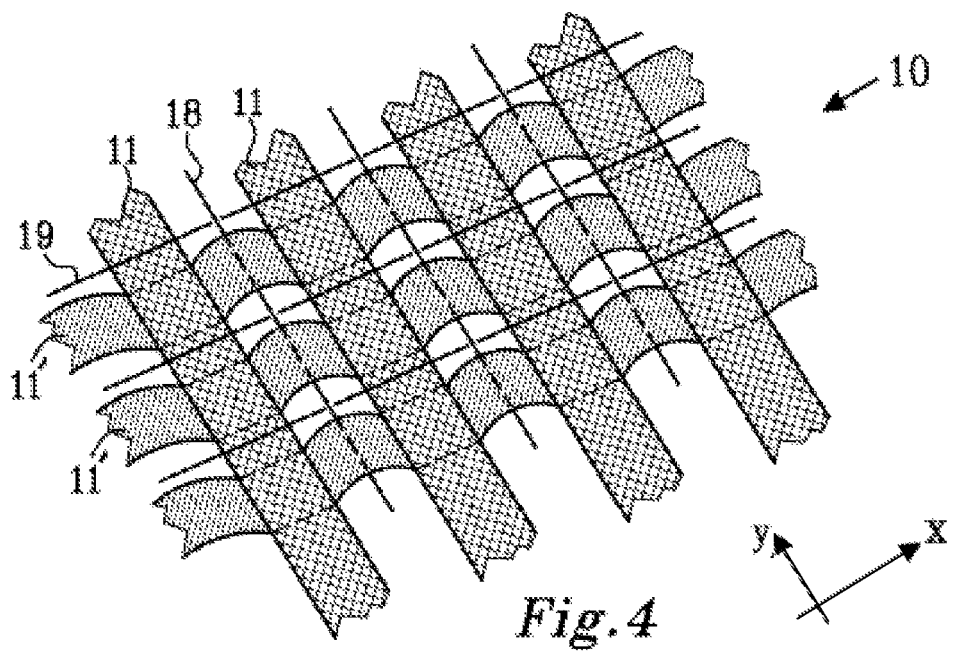
FIG. 4 shows a part of a woven screen according to a further embodiment.

FIG. 4 shows another embodiment of a woven screen as described in U.S. Pat. No. 5,288,545 comprising strips of film material 11 (warp strips) extending in longitudinal direction, y, and strips of film material 11' (weft strips) extending in transverse direction, x. The weft strips 11' in the transverse direction may as shown in FIG. 4 always be on the same side of the warp strips 11 in longitudinal direction or may alternate on the upper and underside of the warp longitudinal strips 11. The warp and weft strips 11 and 11' are held together by a yarn framework comprising longitudinal and transverse threads 18 and 19. The screen may comprise open areas that are free from strips to reduce heat build-up under the screen.

In a greenhouse screen according to the invention at least some of the strips of film material 11 are made of a single or multilayer polyester film wherein the film contains at least 1.0 wt.-% $SiO_2$ and a maximum of 2.5 wt.-% $SiO_2$, and the film has a spreading factor (SF) of at least 2 and not more than 8.

The total thickness of the film is 30 micrometers or less. The minimum thickness of the single or multilayer polyester film strips is preferably 10 micrometers. Preferably, the thickness of the film is at least 14 and not more than 25 micrometers and ideally at least 14.5 micrometers and a maximum of 21 micrometers. If the thickness of the film is below micrometers, the risk of film damages with crack formation during the final application in the greenhouse increases and the mechanical strength of the film will no longer be sufficient to accommodate the pulling forces in the screens arising during use. Above 40 micrometers, the film becomes too stiff and in the opened pulled-out state the screen gives rise to "foil bales" which are too large and give excessive shading.

Single-layer film strips consist of only a single layer of film which is also called base layer (B-layer). In a multilayer embodiment, the film comprises the base layer and at least one further layer (e.g. A- and/or C-layer) which, depending on its position in the film, is referred to the intermediate layer, when at least one further layer is located on each of the two surfaces, or the outer layer, when it forms a coating layer of the film. In the multilayer embodiment, the thickness of the base layer is at least as large as the sum of the thicknesses of the remaining layers. Preferably, the thickness of the base layer is at least 55% of the total film thickness and ideally at least 63% of the total film thickness.

The thickness of the outer layers is preferably at least 0.5 micrometers, preferably at least 0.6 micrometers and ideally at least 0.7 micrometers. The thickness of the outer layers is not more than 4 micrometers and preferably not more than 3 micrometers, and ideally not more than 1.5 micrometers. Below 0.5 micrometers, process stability and the thickness uniformity of the outer layer decreases. From 0.7 micrometers very good process stability is obtained.

The thickness relationship between the base layer and one or more outer layers is important. If the outer layers become too thick the cost-effectiveness decreases, as regenerates originating from the production process have to be added to the base layer, and if the base layer thickness becomes too thin compared to the total thickness of the film, a large percentage of regenerate must be added to this layer. Properties, such as UV-stability and transparency can then also influence the base layer negatively. In addition, the surface effect of silicon dioxide (silica) particles drops in layers thicker than 2 micrometers (and even more particularly in films with 3 micrometer thickness or more) and a greater amount of particles will be required to achieve the desired scattering effect.

UV-Stabilizers

The greenhouse screen advantageously has a low transmission in the wavelength range of less than 370 nm to 300 nm (i.e. within the UV-light range). At any wavelength within this specified range, the transmission should be less than 40%, preferably less than 30%, and ideally less than 15%. This protects the foil against embrittlement and yellowing, and also in this way the plants and installations in the greenhouse are protected against UV-light. Above 390 nm the transparency should be greater than 15%, preferably greater than 20% and ideally more than 30%, since above this wavelength there is clearly photosynthetic activity and plant growth would be negatively impacted due to excessive filtering above this wavelength.

The low UV-permeability is achieved by the addition of one or more organic UV-stabilizers. A low permeability to UV-light protects the film and the flame retardant contained therein from rapid deterioration and severe yellowing. The organic UV-stabilizer is selected from the group consisting of triazines, benzotriazoles or benzoxazinones. A particularly preferred triazine is 2-(4,6-diphenyl-1,3,5-triazin-2-yl)-5-(hexyl) oxy-phenol (Tinuvin® 1577).

The film, or in the case of a multilayer film, at least one outer layer, preferably both outer layers contain at least one organic UV-stabilizer from the above list. Preferred UV-stabilizers are triazine derivatives, in particular 2-(4,6-diphenyl-1,3,5-triazin-2-yl)-5-(hexyl) oxy-phenol (Tinuvin® 1577). Triazine derivatives are particularly preferred because they have a good thermal stability and a low outgassing from the screen in the conventional polyethylene terephthalate processing temperatures of 275-310° C.

Advantageously UV-stabilizers are contained in the outer layers or monofilms in quantities of between 0.3 and 3 wt.-%, based on the weight of the layer into which they are added. Particularly preferred is a UV-stabilizer content of between 0.75 and 2.8 wt.-%. Ideally, the outer layers contain 1.2 to 2.5 wt.-% of UV-stabilizer. In the multilayer embodiment, in addition to the outer layers, preferably also the base layer comprises a UV-stabilizer. The content of the UV-stabilizer in wt.-% is preferably lower in the base layer, than in the outer layer (s). These specified contents in the layers relate to triazine. If instead of a triazine derivative, a UV-stabilizer from the group of benzotriazoles or benzoxazinones is used, the triazine component must be replaced by 1.5 times the amount of a benzotriazole or benzoxazinone component.

Light Scattering Particles

The film includes, for the purpose of light scattering, silicon dioxide ("light scattering particles"). In the case of a multilayer film at least the base layer includes silicon dioxide in an amount of at least 1.0 wt.-%, preferably at least 1.15 wt.-% and ideally at least 1.25 wt.-% by weight, based on the total weight of the film. The content of $SiO_2$ particles should not be more than 2.5 wt.-% by weight, preferably not more than 2.0 wt.-%, and ideally not more than 1.7 wt.-%. If the content of the particles is too low, the light diffusing effect becomes too low. If the content is too large, the transparency decreases, the undesired "transparency bow", the variation in the transparency across the web width (i.e. more exactly the difference in transparency between the web edge about 50 cm away from the clips and web center), increases and the manufacturing safety deteriorates during the film production.

Advantageously the silicon dioxide particles have an average particle size d50 of 2-10 micrometers, preferably 3-9 micrometers, more preferably 4-8 micrometers, and ideally a d50 value of 5-7 micrometers. These figures relate to the particle size of the particles as measured by a Malvern Mastersizer 2000. Compared to particles of the aforementioned size ranges, a use of particles with a d50 value of less than 2 micrometers results in a lower light scattering angle and a greater transparency reduction than when the particle content (in wt.-%) corresponds to that of the $SiO_2$ particles in the range mentioned above.

Particles with a d50 value of greater than 10 micrometers result in the same particle content (in wt.-%) but gives no further improvement in the light-scattering effect, as compared to particles in the desired size range. In addition, large voids (cavities) form around the larger particles and these act by reducing transparency and are also not formed uniformly over the film width, as these particles are bigger and tend to orient in the edge region in the machine direction during the production of the film web. This leads to a "transparency" and "scattering bow" over the film width, which is undesirable in the final application.

Although white-coloring polymers have good light scattering effects, they are incompatible with the major component of polyester films, such as polypropylene, cyclic olefin copolymers (COC's), polyethylene, polystyrene, etc. White-coloring polymers also have a strong negative influence on the burning behavior of the film. Furthermore they tend be influenced by UV-light and cause excessive yellowing and would therefore require a substantial additional amount of UV-stabilizer, which significantly worsens the economy of the screen. White coloring pigments are therefore preferably added in an amount of less than 0.3 wt.-% (based on the weight of the film), and ideally not at all.

Advantageously, the film has three layers, and at least 75%, and particularly preferably at least 95% of the particles used for the purpose of light scattering are present in the base layer. Ideally, the outer layers each contain less than 1.5% of the light scattering particles. This distribution of light scattering particles leads to a significantly improved manufacturing ability and in particular also to a significantly improved thickness uniformity compared e.g. to a monolayered film or of a film with a higher than the preferred proportion of particles in the top layer. Furthermore, with the given distribution of the light scattering particles, the roughness of the film decreases, which results in a decreased tendency of the film to become polluted (and thereby loss of transparency) in the end usage.

Particles to Improve Windability

The base layer and outer layer (s) may also include other particles for improving light scattering effect, and/or to improve the windability of the film. Such inorganic or organic particles are for example, calcium carbonate, apatite, other silicas (in particular smaller silica particles than those previously described), aluminium oxide, crosslinked polystyrene, crosslinked poly-methyl-methacrylat (PMMA), zeolites, and other silicates such as aluminum silicates, or also white pigments such as $TiO_2$ or $BaSO_4$. These particles are preferably added to the outer layers to improve the winding capability of the film. When such particles are added, the use of silica-based particles is preferred because their lack of transparency has a reducing effect and also contributes to the light scattering effect. The proportion of these other particles is in any layer no more than 1 wt.-% and is preferably less than 0.5 wt.-%, and ideally below 0.2 wt.-% in each layer, in each case based on the total weight the relevant layer.

Flame Retardants

Screens in greenhouses can be a potential fire hazard, since a fire starting by for example an electrical failure can spread to the entire greenhouse by the screen causing huge economic damages. Hence, since a few years the state of the art is flame retardant screens. To achieve a suitable fire performance for greenhouse curtains, no flame retardants are needed if the levels of light scattering particles and other particles, as well as white pigments and incompatible polymers are within the preferred, or better within the most preferred ranges. Such a film achieved a score in the fire test of 4 or lower.

If levels in one of the groups mentioned are higher than the preferred levels, or if for a special greenhouse application an even further reduction in flammability is required, it has proven to be advantageous that the film also contains a flame retardant based on organophosphorus compounds. Preferably, these flame retardants are esters of phosphoric acid or phosphorous acid. It has proven to be advantageous if the phosphorus-containing compound is part of the polyester. Polymerized phosphorus-containing flame retardants such as Adeka rod 700 (4,4'-(Isopropylidene-diphenyl) to (diphenyl phosphate)) have, in addition to the disadvantage of outgassing of the flame retardant during production, also a very strong adverse effect on the hydrolytic stability of the film, i.e., the polyester, so that in the humid greenhouse climate it will produce rapid embrittlement of the film and the screens therefore need to be replaced more often. These effects are significantly reduced by the use of built-in polyester chain phosphorus compounds.

The phosphorus can be part of the main chain, such as with the use of 2-carboxyethyl-methylphosphinic acid (other suitable compounds are described for example, in DE-A-23 46 787). However, particularly preferred are phosphorus compounds in which the phosphorus is in a side chain, since this reduces the tendency to hydrolyze under greenhouse conditions. Such preferred compounds are compounds of the formula (I):

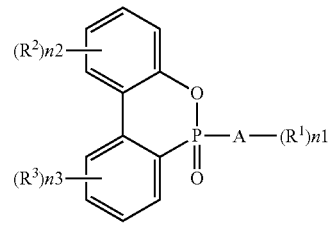

(I)

wherein:
R$^1$ is an ester-forming group selected from —COOR$^4$, —OR$^5$ and —OCOR$^6$;
R$^2$ and R$^3$ are independently selected from halogen atoms, hydrocarbon groups having 1-carbon atoms and R$^1$;
R$^4$ is a hydrogen atom, a carbonyl group or a hydrocarbon group having 1-10 carbon atoms which may contain a hydroxyl group or a carboxyl group;
R$^5$ is a hydrogen atom or a hydrocarbon group having 1-10 carbon atoms which may contain a hydroxyl group or a carboxyl group;
R$^6$ is a hydrocarbon group having 1-10 carbon atoms which may contain a hydroxyl group or a carboxyl group;
A is a divalent or trivalent hydrocarbon group having 1-8 carbon atoms;
n1 is 1 or 2;
and n2 and n3 are each 0, 1, 2, 3 or 4, particularly wherein said compound of formula (I) contains two ester-forming functional groups.

Particularly suitable is 6-oxo-dibenzo [c, e]-[1,2] oxaphosphorin-6-ylmethyl-succinic acid-bis (2-hydroxyethyl) ester (CAS 63562-34-5 No.). When using this monomer in the production of polyester, polymers with a relatively low susceptibility to hydrolysis result, which also can give good operational reliability in the film production process.

The amount of flame retardants is advantageously adjusted so that the proportion of phosphorus in the film is at least 500 ppm, preferably at least 1200 ppm, and ideally at least 1600 ppm. The proportion of phosphorus should lie below 5000 ppm, preferably below 4000 ppm and ideally below 3000 ppm (based on the respective weights of all components used i.e. the amount of substance in moles). If the phosphorus content is below 500 ppm, the film will burn too quickly. The higher the proportion of phosphorus is, the lower the speed of burning will be, but this also lowers the hydrolysis stability. Above 5000 ppm, the film can be used for maximally a calendar year. Below 3000 ppm the hydrolysis speed is low enough, so that decomposition by hydrolysis is not to be expected within several years of use.

The phosphorus content may be distributed equally or differently between the layers. However, it has proven advantageous if the outer layers contain at least 75% of the phosphorus concentration of the inner layer (s), preferably they contain the same concentration of phosphorus and ideally the outer layers contain at least 5% more phosphorus than the base layer. This leads to a particularly favorable burning behavior and an overall lower amount of phosphorus is needed.

Polymers and Monomers Contained in the Base Layer and Other Layers of the Film

The polymer of the base layer and of the other layers of the film (excluding UV-stabilizers, light scattering particles, flame retardants, polyolefins, and other additives) is preferably made from a thermoplastic polyester to at least 80 wt.-%. Suitable thermoplastic polyesters for this purpose are, inter alia, a polyester of ethylene glycol and terephthalic acid (polyethylene terephthalate, PET), of ethylene glycol and naphthalene-2,6-dicarboxylic acid (=polyethylene-2,6-naphthalate, PEN), as well as any mixtures of said carboxylic acids and diols.

Particular preference is given to polyesters consisting of at least 85 mol %, preferably of at least 90 mol % and ideally of at least 92 mol % of ethylene glycol and terephthalic acid units. There is no beneficial use of naphthalene-2,6-dicarboxylic acid when compared to the use of terephthalic acid, and therefore the latter is usually preferred due to the higher price of naphthalene-2,6-dicarboxylic acid. Remaining constituents are monomer units deriving from aliphatic, cycloaliphatic or aromatic diols or dicarboxylic acids.

Suitable aliphatic diols are, for example, diethylene glycol, triethylene glycol, aliphatic glycols of the formula HO—$(CH_2)_n$—OH, where n is preferably less than 10, cyclohexanedimethanol (CHDM), butanediol, propanediol, etc. Suitable dicarboxylic acids are, for example, isophthalic acid (IPA), adipic acid etc.

However, it has proved advantageous that the total content (based on the total weight of the film) of monomer units such as isophthalic acid, diethylene glycol and CHDM is not greater than 7 wt.-%, and ideally is less than 6 wt.-%. If the content of said co-monomers, in particular of the CHDM, does not exceed the said limits, the UV-stability of the screen made from the film is significantly better than in embodiments in which the limits are exceeded. Preferably the wt.-% of 1,4-cyclohexanedimethanol (CHDM) is less than 3 wt.-%, ideally less than 1 wt.-%.

Furthermore, it has proven favorable for the reliability and weathering resistance in greenhouse applications if the film contains less than 2 wt.-%, preferably less than 1.5 wt.-% diethylene glycol or units derived therefrom.

For the same reasons it has proven to be advantageous if the film contains less than 12 mol %, preferably less than 8 mol %, and ideally less than 5 mol % of isophthalic acid. However, in a multilayer film, at least one of the outer layers should advantageously contain more than 8 mol % IPA, and ideally more than 10 mol % IPA, but less than 23 mol % IPA, preferably less than 19 mol %, and ideally less than 15 mol %. The presence of IPA in the outer layers serves to increase the transparency of the film.

Advantageously a layer with an IPA content of more than 8 mol % contains additionally at least 1.5 wt.-%, preferably more than 2.1 wt.-% of an organic UV-stabilizer (as described above) to compensate for the lower UV-stability in layers with higher IPA content.

Standard Viscosity (SV) of the Film

For the production of the inventive film the standard viscosity (SV) value of the polyester is selected so that the film ideally has a SV value >700, a SV of >600, preferably >650. The SV value of the film should be <950, preferably <850. If the SV value is below 600, the film becomes brittle, causing frequent breaks during production. In addition, in greenhouses, there will be a more rapid further viscosity loss with loss of flexibility of the film resulting in breaking and premature failure of the screen. In addition, the mechanical properties mentioned below can no longer be achieved with a lower SV value. If the film has a higher SV than 950, then the polymer is so tough due to the high particle load in the extruder that excessively high currents can occur during operation of the extruder-electric motors and lead to pressure fluctuations during extrusion. This leads to poor operational reliability. In addition, the wear on the extrusion dies and the cutting tools becomes disproportionately high Transparency and Light Scattering Properties of the Film The transparency in combination with a suitable scattering behavior is of particular importance when the inventive films are used in greenhouse-screens. As a rule, thereby a particularly high transparency is desired to supply the plants with as much light as possible. However, in regions with very warm climates a reduction in the amount of light may be desirable in particular around the two hours of sun peaking. The inventive film suitable for screens in these climate zones has preferably a transparency which is between 70 and 92%. For temperate climates (e.g. Europe, North America, Japan) the transparency of the film of the invention is advantageously at least 80% and especially at least 83%.

For the appropriate scattering properties of the novel film three parameters are essential in addition to the transparency. The first essential parameter is the haze. It should be between 60-95%, preferably between 65 and 90% and ideally 70-86%. The second parameter is the clarity of the film. This should be between 15-40%, preferably between 18 and 35%, and ideally 21 to 30%. If the haze is too high, or the clarity is too low, the light becomes too dispersed. Due to a strong backscatter the high transparency values can no longer be achieved, and especially due to the high proportion of scattered light, too much light is lost in the environment of the greenhouse without reaching the plants. Then the ultimate goal by using light scattering films, namely the illumination of lower parts of plants cannot be achieved as the upper regions of the plants absorb the light and shade the lower portions of the neighboring plants.

If the haze is too low, or the clarity is too high, the light is not sufficiently diversified and the upper regions of the plant throw a drop shadow to lower parts. The upper leaves receive too much light and photosynthetic activity decreases by excessive heating, while the lower leaves do not get enough light for maximum photosynthetic activity. Within the above limits, the mean scattering angle is optimized for optimum illumination of the plants.

The two standard parameters haze and clarity do not describe the scattering of light sufficiently enough as they do not take the transparency of the film into account. Therefore, also the spreading factor (SF) must be considered. The spreading factor is the ratio of transparency measured according to ASTM D 1003-61 (Method A), and transparency as measured by the Clarityport (see measurement methods):

SF=transparency according to ASTM D 1003-61 (Method A)/transparency measured by Clarityport The spreading factor SF is between 2 and 8, preferably between 2.5 and 7 and ideally between 3 and 4.5. If the spreading factor is too low, too much un-scattered light passes through the film at the given transparency, resulting in the above-described insufficient illumination of the lower parts of plants. If the spreading factor is too high at the set transparency, too much light (too much light scattering) is lost to the environment of the greenhouse leading to excessive shading by neighboring plants.

The transparency of the film and its scattering behavior (optionally also the distribution of the particles across the layers) is achieved by the selection of polymers in the preparation process below, and optionally, by the addition of suitable particles (particularly particle size) and particle content.

In particular, for the achievement of high transparency values, it has proven favorable if the film is multilayered and contains at least one outer layer that has an IPA content of 8 wt.-% IPA, ideally more than 10 wt.-% IPA, but less than 23 wt.-% IPA, preferably less than 19 wt.-%, and ideally less than 15 wt.-% IPA. Advantageously the multilayered film has an outer layer on both sides with the given IPA content. These outer layers have a thickness of <2 micrometers, and preferably of <1.5 micrometers. Such reflective outer layers decrease the loss of transparency of the film. It has for the same reason proven to be beneficial when the film at least on one side, preferably on both sides, has a coating with a material, which has a lower refractive index than the polyester film.

Particularly suitable are polyacrylates and silicones. Suitable acrylates are described for example in EP-A-0144948 and suitable silicones for example, in EP-A-0 769 540. The thickness of these coating(s) is at least 30 nm preferably at least 50 nm and in particular at least 75 nm and is a maximum of 150 nm, preferably not more than 130 nm, and ideally a maximum of 110 nm. In this way an ideal transparency increase is achieved in the desired wavelength range. The coatings are preferably incorporated prior to transverse stretching of the film by known methods (reverse gravure roll or meyer bar) preferably by applying an aqueous dispersion to the film. Advantageously the coating contains at least 1 wt.-% of a UV-stabilizer, Tinuvin® 479, Tinuvin® 5333 or DW is particularly preferred.

A Process for Preparation

Polyester polymers of the individual layers are prepared by poly condensation, either starting from dicarboxylic acids and diol or from the esters of dicarboxylic acids, preferably the dimethyl, and diol. Suitable polyesters preferably have SV values in the range from 500 to 1300 in which the individual values are less important, but the average SV value of the materials used must be greater than 700 and is preferably greater than 750.

The white-colored pigments, $SiO_2$ particles, and UV-stabilizers may be added during the actual preparation of the polyester. For this purpose, the particles are dispersed in the diol, optionally ground, decanted and/or filtered and is added to the reactor either during the (trans) esterification step or in the poly condensation step. Preferably, a concentrated particle-containing or additive-containing polyester masterbatch can be produced with a twin-screw extruder and can be diluted during the film extrusion with particle-free polyester. It has proven to be favorable when masterbatches which contain less than 30 wt.-% polyester are used. In particular, the amount of $SiO_2$ particles contained in the masterbatch should not exceed 20 wt.-% pure $SiO_2$ (the danger of gel formation). Another option is to add particles and additives directly during film extrusion in a twin-screw extruder.

If screw extruders are used, it has proven advantageous to dry the polyesters beforehand. When using a twin-screw extruder with degassing zone the drying step can be dispensed with.

First, the polyester or the polyester mixture of the individual layers in the single layer or multi-layer films are compressed and liquefied in extruders. The melt(s) in a single or multilayer is/are thereafter formed to flat melt films, pressed through a slot die and drawn off on a chill roll and one or more take-off rolls, whereupon it cools and solidifies.

The inventive film is biaxially oriented, i.e. biaxially stretched. The biaxial orientation of the film is most frequently carried out sequentially. Here the film is preferably stretched first longitudinally (i.e. in the machine direction=MD) and then transversely (i.e. perpendicularly to machine direction=TD). The longitudinally oriented stretching can be carried out by means of two rollers running at different speeds corresponding to the desired stretching ratio. For the transverse stretching an appropriate tenter frame is generally used.

The temperature at which the stretching is carried out can vary within a relatively wide range and depends on the desired properties of the film. In general the stretching in the longitudinal direction is performed in a temperature range of 80 to 130° C. (heating temperatures 80 to 130° C.) and in the transverse direction in a temperature range of 90° C. (start of stretching) to 140° C. (end of the stretching). The longitudinal stretching ratio is in the range of 2.5:1 to 4.5:1, preferably from 2.8:1 to 3.4:1. A higher longitudinal stretching ratio than 3.4 tends to reduce the light scattering effect and should therefore be avoided. A stretch ratio above 4.5 leads to a significant deterioration in manufacturability (tears). The transverse stretching ratio is generally in the range of 2.5:1 to 5.0:1, preferably from 3.2:1 to 4:1. A higher transverse stretching ratio than 4 tends to reduce the light scattering effect and the transparency and increases the unwanted transparency bow which should absolutely not be greater than 2%. For example, for a transparency in the web center of 80% and 75% at the edges gives a deviation of 5% in absolute terms which is bad, and should therefore preferably be avoided.

To achieve the desired film properties, it has proven advantageous when the stretch temperature (in MD and TD) is at 125° C. and preferably below 118° C. Before the transverse stretching, one or both surface (s) of the film may be coated in-line according to methods known per se. The in-line coating can preferably be used for applying a coating to increase transparency (anti-reflection). In the subsequent heat-setting, the film is held under tension over a period of about 0.1 to 10 s at a temperature of 150 to 250° C., and to achieve the preferred shrinkage and extension values it is relaxed at least 1%, preferably at least 3% and particularly preferably at least 4% in the transverse direction. This relaxation will advantageously take place in a temperature range of 150 to 190° C. In order to reduce the transparency bow, the temperature in the first fixing zone is preferably below 220° C. and more preferably below 190° C. In addition, for the same reason, at least 1% preferably at least 2% of the total transverse stretching ratio should preferably lie in the first fixing region, in which it is usually not stretched. The film is then wound up in a customary manner.

Other Film Properties

The inventive film according to the method described above preferably has a shrinkage at 150° C. in longitudinal and transverse direction of less than 3%, preferably below 2% and more preferably of less than 1.5%. This film has a further shrinkage to an extent of less than 3%, preferably less than 1% and more preferably of less than 0.3% at 100° C. This dimensional stability can be obtained prior to winding, for example, by appropriate relaxation of the film (see process description). This dimensional stability is important in order to avoid a subsequent shrinkage of the film strip when used in screens, which would lead to the translucence of light between the strips. Relaxation is performed both in the manufacture of roller screens as well as greenhouse screens as shrinkages or extensions which are too large will result in wave-like alterations in the finished products.

The film of the invention further comprises a modulus of elasticity in both directions on the film which is greater than 3000 N/mm$^2$ and preferably greater than 3500 N/mm$^2$ and more preferably (in at least one film direction)>4500 N/mm$^2$ in the longitudinal and transverse directions. The F5-value (force at 5% extension) is preferably in the longitudinal and transverse direction at about 80 N/mm$^2$ and more preferably about 90 N/mm$^2$. These mechanical properties can be set and obtained by varying the parameters of the biaxial stretching of the film in the context of the abovementioned process conditions.

Films with said mechanical properties are not extended excessively during usage when pulled and remain easily manageable.

Application

Films of the invention are outstandingly suitable as light scattering film, in particular for the production of screens in greenhouses. Here, the film is usually cut into narrow strips with a width of 2-10 mm, from which then together with polyester yarn (also this must be UV stabilized) a fabric or screen is produced, which is hung in the greenhouse. The strips of inventive film can be combined with strips of other films. Such strips may be of materials providing desired heat transporting and shading properties and be of plastic film, metal foil or laminates of plastic and metal. It is also possible to make a screen having "open" areas free from strips permitting ventilation through said screen.

In order to provide the desired light scattering properties at least 10%, preferably at least 20%, more preferably at least 30%, more preferably at least 40%, more preferably at least 50%, more preferably at least 60%, more preferably at least 70%, more preferably at least 80%, more preferably at least 90% of the surface area of the screen should be strips (11) of the single or multilayer film according to the invention. According to one embodiment all strips (11) in the screen are of the single or multilayer polyester film described and the strips (11) are arranged closely edge to edge, so that they form a substantially continuous surface. Alternatively, the film itself is installed in the greenhouse.

In some embodiments the strips of inventive film may be interconnected by a yarn framework having liquid-transporting capacity by capillary action. Advantageously the yarn framework is thermally bonded to at least one side of the strips of film material, and wherein also those parts of the yarn framework that are thermally bonded to the strips have liquid-transporting capacity by capillary action.

These installations described above result in a reduction of the amount of light hitting the plants and thus to cooling during the day. At the same time they distribute the remaining amount of light homogenously due to the high light scattering in space thereby ensuring a good illumination of all plants and plant parts. During the night these installations lead to a lower heat loss from the greenhouse to the outside.

Analytical Methods

The following analytical methods were used to determine parameters used:

Measurement of the Mean Particle Diameter d50

Determination of the average particle size d50 was carried out using a Malvern Mastersizer 2000. For this, the particles were dispersed in water and transferred to a cuvette that was analyzed in the meter wherein the size of the particles was determined by laser diffraction. In general, while the detector captures an image intensity of the diffracted laser light from the angle-dependent light intensity using a mathematical correlation function, the particle size distribution is calculated. The particle size distribution is characterized by two parameters, the median value d50 (=measure of location for the average value) and the degree of scatter SPAN98 (=measure of the scatter of the particle diameter). The test procedure was carried out automatically and included the mathematical determination of the d50 value.

Measurements on the film produced with these particles result in a 15-25% lower d50 value compared to the initial value of the particles before the start of production.

UV/Vis Spectra or Transmission at Wavelength x

Transmission of the films were measured in a UV/Vis double beam spectrophotometer (Lambda 12 or 35) Perkin Elmer USA. An approximately (3×5) cm wide film specimen is inserted into a flat sample holder perpendicular to the measurement beam in the beam path. The measurement beam was directed via a 50 mm integrating sphere toward the detector where the intensity is used to determine the transparency at the desired wavelength.

The background was air. The transmittance is read at the desired wavelength.

Transparency

Transparency was measured in accordance with ASTM-D 1003-61 (Method A) by haze-Gard plus from BYK-Gardner GmbH Germany.

Clarity

Determination of the clarity is carried out according to ASTM-D-1003 and by haze-gard plus from BYK-Gardner GmbH. The light is deflected within a small solid angle, so that the amount of scattered light is concentrated in a narrow lobe. Clarity is measured in an angular range of less than 2.5°. To measure the clarity, the film is applied close to the light exit-opening. (Image sharpness)

Assessment of Light Scattering Property (Measurement of Scattering Factor SF)

The light scattering properties are of particular importance for the inventive film. The measurement was carried out by means of a "haze-gard plus" transparency/opacity meter from BYK Gardner (BYK-Gardner GmbH, Lausitzer Strasse 8, 82538 Geretsried, Germany). To measure SF, the transparency of the film is measured when it is held by tension in a clamping ring by holding the film flush to the measurement opening used for turbidity and transparency measurements as described in ASTM D-1003-61 (Method A). Then, the clamped film was held flush against the light exit-opening (as in the Clarity measurement) while transparency was measured again. The light scattering factor SF corresponds to the ratio of these two readings:

SF=transparency (measured according to ASTM D-1003-61 Method A)/transparency measured before light exit opening SV (Standard Viscosity)

The standard viscosity SV, was measured based on DIN 53 726, at a concentration of 1% in dichloroacetic acid (DCA) in an Ubbelohde viscometer at 25° C., which measures the time required for the solution to pass through a capillary. The viscosity of the DCA solution comprising the dissolved film corresponds to the mean chain length of the polymer used. Insoluble material like inorganic particles (e.g. TiO$_2$ or SiO$_2$) does not influence the viscosity measurement, but has to be accounted for during sample weighing (see below). From the relative viscosity ($\eta$rel) the dimensionless SV value is determined as follows:

SV=($\eta$rel−1)×1000

To be able to compare the chain lengths of polymers used in an unfilled film versus a filled film, the amount of insoluble material has to be taken into account in case the film contains such particles. Polymer raw materials or film containing insoluble particles were dissolved in DCA and the insoluble pigments centrifuged before measuring. The proportion of insoluble particles was determined by ash determination. In case a filled film is to be analyzed, a larger amount of filled film has to be dissolved in dichloroacetic acid compared to unfilled film. The following formula is used to calculate the weight of the sample to be dissolved in DCA in case the film contains insoluble particles:

Total weight of sample (filled film) to be dissolved in DCA=(weight of the sample for an unfilled film)/((100−insoluble particle content of filled film in wt. %)/100). For example if 0.4 g of standard unfilled film is dissolved in 40 ml DCA, and the filled film to be analyzed contains 5% insoluble particles (as determined by ash determination), 0.42 g of filled film has to be dissolved in 40 ml DCA to compensate for the weight of insoluble particles: 0.4 g/((100−5)/100)=0.42 g Mechanical Characteristics The mechanical properties were determined according to the tensile test DIN EN ISO 572-1 and -3 (specimen type 2) on 100 mm×15 mm film strips.

Shrinkage

Thermal shrinkage was determined on square film samples with an edge length of 10 cm. Samples were cut out so that one edge was parallel to the machine direction and one edge was perpendicular to the machine direction. The samples were measured precisely (edge length $L_0$ was determined for each machine direction TD and MD, i.e. $L_{0\ TD}$ and $L_{0\ MD}$) and annealed 15 min at the stated shrinkage temperature (here 150° C.) in a convection oven. The samples were removed and measured precisely at room temperature (edge length $L_{TD}$ and $L_{MD}$). Shrinkage is calculated from the equation:

Shrinkage[%]MD=100·$(L_{0\ MD}-L_{MD})/L_{0\ MD}$, or

Shrinkage[%]TD=100·$(L_{0\ TD}-L_{TD})/L_{0\ TD}$

Expansion

The thermal expansion was determined on square film samples with an edge length of 10 cm. The samples were measured precisely (edge length $L_0$), annealed for 15 minutes at 100° C. in a convection oven, and then measured precisely at room temperature (edge length L). The expansion results from the equation:

Expansion[%]=100·$(L-L_0)/L_0$ and was determined separately in each direction on the film.

UV-Stability

The UV-stability and the UTS value was determined and specified in % of initial value as in DE69731750 on page 8 (DE of WO9806575), except that the exposure time was not 1000 h but 2000 h.

Flame Resistance

A 30×30 cm piece of film was fastened with two clips at the corners and hung vertically. Generally, it must be ensured that at the point of suspension, there is no air movement, which moves the piece of film. A slight air from above is acceptable. The film piece was then exposed to a flame from below in the center of the lower side. For flame treatment, a commercial cigarette lighter, or better a Bunsen burner is used. The flame must be longer than 1 cm and less than 3 cm. The flame was held long enough to the film until this continued to burn without an ignition flame (at least 3 seconds). The flame was thereby held maximally for 5 seconds at the most, after which the burning and shrinkage was examined. Four such ignition processes were performed.

In the examples given here, the flame resistance is evaluated with the following grades:

1=the film was ignited during 4 ignitions, and never burned more than 3 seconds.

2=the film ignited and extinguished after less than 15 seconds, and more than 30% of the film surface remained.

3=the film ignited and extinguished after less than 20 seconds, and more than 30% of the film surface remained.

4=the film ignited and extinguished after less than 40 seconds, and more than 30% of the film surface remained.

5=the film ignited and extinguished after less than 40 seconds and more than 10% of the film surface remained.

6=the film ignited and burned more than 40 seconds, or less than 10% of the film surface remained after extinction

EXAMPLES

Example 1-3 and VB1-7

Polymer mixtures are melted at 292° C. and electrostatically applied through a slot die onto a cooling roll at a temperature controlled to 50° C. It is thereafter longitudinally and transversely stretched under the following conditions:

Longitudinal Stretching:
  Heating temperature 75-115° C.
  Stretching temperature 115° C.
  Longitudinal stretching ratio 3.8
Transverse Stretching
  Heating temperature 100° C.
  Stretching temperature 112° C.
  Transverse stretching ratio (including stretching in first fixation zone) 3.9.
Setting:
  Temperature 237-150° C.
  Duration 3 s
  Relaxation in TD at 200–150° C. 5%
Fixing:
  Temperature in first fixation zone: 170° C.

In the examples the following substances are used:

PET 1=polyethylene terephthalate made from ethylene glycol and terephthalic acid having an SV value of 820 and diethylene glycol (DEG) content of 0.9 wt.-% (diethylene glycol as a monomer).

PET 2=polyethylene terephthalate with a SV value of 720 and 23% bis [(5-ethyl-2-methyl-1,3,2-dioxaphosphorinan-5-yl) methyl] methyl phosphonate P, P'-dioxide (Amgard P 1045) equivalent to 18,000 ppm of phosphorus from Amgard. The Amgard was incorporated in a twin-screw extruder in the polyethylene terephthalate.

PET 3=polyethylene terephthalate with a SV value of 730, the (6-oxo-dibenz [c, e]-[1,2] oxaphosphorin 6-ylmethyl)-succinic-bis (2-hydroxyethyl) ester as a co-monomer, wherein the proportion of phosphorus therefrom is 18,000 ppm in the raw materials.

PET 4=polyethylene terephthalate with a SV value of 700, which contains 20 wt.-% Tinuvin® 1577. The UV stabilizer has the following composition 2-(4,6-diphenyl-1,3,5-triaziin-2-yl)-5-(hexyl) oxy-phenol (Tinuvin® 1577 from BASF, Ludwigshafen, Germany). Tinuvin® 1577 has a melting point of 149° C. and is thermally stable at 330° C.

PET 5=polyethylene terephthalate with a SV value of 700 and 15 wt.-% silica Sylysia 440 with a d50 of 6.2 micrometers (manufacturer FUJI Silysia Chemical LTD. Greenville N.C./USA). The $SiO_2$ was incorporated in the polyethylene terephthalate in a twin-screw extruder.

PET 6=polyethylene terephthalate with a SV value of 700 and 15 wt.-% silica dioxide particles Sylysia 310 P with a d50 of 2.7 micrometers (manufacturer FUJI Silysia Chemical LTD. Greenville N.C./USA). The SiO$_2$ was incorporated in the polyethylene terephthalate in a twin-screw extruder.

PET 7=polyethylene terephthalate with a SV value of 600 and 60 wt.-% TiO$_2$ (Type R-104 from DuPont, USA, in the rutile modification). The TiO$_2$ was incorporated in the polyethylene terephthalate in a twin-screw extruder.

PET 8=polyethylene terephthalate with a SV value of 710, which contains 25 mol % of isophthalic acid as a co-monomer.

The following table (Table 1) summarizes the formulations, manufacturing conditions and the resultant film properties.

TABLE 1

| | | Ex. 1 | Ex. 2 | Ex. 3 | Ex. 4 | Ex. 5 | VB1 | VB2 | VB3 | VB4 |
|---|---|---|---|---|---|---|---|---|---|---|
| Layer | Thickness of film | 15 | 19 | 15 | 19 | 15 | 19 | 15 | 15 | 15 |
| | Thickness of layer A | 0.8 | 1 | 0.8 | 0.7 | 0.8 | 1 | 0.8 | 0.8 | 0.8 |
| | Thickness of layer B | 13.4 | 17 | 13.4 | 16.8 | 13.4 | 17 | 13.4 | 13.4 | 13.4 |
| | Thickness of layer C | 0.8 | 1 | 0.8 | 1.5 | 0.8 | 1 | 0.8 | 0.8 | 0.8 |
| | Coating | | | | | Dry thickness 80 nm. Acrylate and method as in Example 1 of EP0144948 | | | | |
| A-layer | PET 1 | 89 | 89 | 74 | 89 | 89 | 89 | 74 | 89 | 89 |
| | PET 2 | | | | | | | 15 | | |
| | PET 3 | | | 15 | | | | 0 | | |
| | PET 4 | 10 | 10 | 10 | 10 | 10 | 10 | 10 | 10 | 10 |
| | PET 5 | | | | | | | | | |
| | PET 6 | 1 | 1 | 1 | 1 | 1 | 1 | 1 | 1 | 1 |
| | PET 7 | | | | | | | | | |
| | PET 8 | | | | | | | | | |
| | PET 9 | | | | | | | | | |
| B-layer | PET 1 | 81 | 81.5 | 66 | 81 | 81 | 69 | 66 | 86 | 85 |
| | PET 2 | | | | | | | 15 | | |
| | PET 3 | | | 15 | | | | 0 | | |
| | PET 4 | 9 | 9 | 9 | 9 | 9 | 9 | 9 | 9 | 9 |
| | PET 5 | 10 | 9.5 | 10 | 10 | 10 | 22 | 10 | 2 | 0 |
| | PET 6 | | | | | | | | | 6 |
| | PET 7 | | | | | | | | 3 | |
| | PET 8 | | | | | | | | | |
| | PET 9 | | | | | | | | | |
| C-layer | PET 1 | 89 | 89 | 74 | 0 | 89 | 89 | 74 | 89 | 89 |
| | PET 2 | | | | | | | 15 | | |
| | PET 3 | | | 15 | | | | 0 | | |
| | PET 4 | 10 | 10 | 10 | 14 | 10 | 10 | 10 | 10 | 10 |
| | PET 5 | | | | | | | | | |
| | PET 6 | 1 | 1 | 1 | 1 | 1 | 1 | 1 | 1 | 1 |
| | PET 7 | | | | | | | | | |
| | PET 8 | | | | 85 | | | | | |
| | PET 9 | | | | | | | | | |
| Transparency (web center) | in % | 85 | 83 | 84 | 86 | 87 | 69 | 82 | 63 | 92 |
| Transparency bow | | 1.8 | 1.5 | 1.7 | 1.7 | 1.8 | 3 | 1.8 | 3.7 | 0.5 |
| Clarity | | 24 | 22 | 23 | 25 | 23 | 11 | 22 | 10 | 45 |
| Haze | | 77 | 80 | 78 | 79 | 77 | 96 | 77 | 93 | 57 |
| Spreading Factor (SF) | | 3.4 | 3.6 | 3.3 | 3.5 | 3.5 | 12 | 3.4 | 9 | 1.6 |
| UV-stability UTS | in % | 70 | 75 | 61 | 70 | 70 | 64 | 51 | 75 | 71 |
| Flammability | | 4 | 3 | 2 | 3 | 4 | 5 | 2 | 5 | 4 |
| E-modulus in MD | N/mm$^2$ | 4100 | 4200 | 3900 | 3900 | 4100 | 3900 | 3800 | 4100 | 4100 |
| E-modulus in TD | N/mm$^2$ | 4700 | 4600 | 4100 | 4000 | 4600 | 4000 | 3900 | 4600 | 4700 |
| F5 MD | N/mm$^2$ | 105 | 106 | 101 | 102 | 106 | 98 | 91 | 107 | 105 |
| F5 MD | N/mm$^2$ | 114 | 110 | 100 | 101 | 113 | 102 | 95 | 111 | 115 |
| Shrinkage in MD | in % | 1.4 | 1.3 | 1.5 | 1.2 | 1.6 | 1.5 | 1.2 | 1.4 | 1.3 |
| Shrinkage in TD | in % | 0.2 | 0.3 | 0.3 | 0.3 | 0.3 | 0.2 | 0.1 | 0.2 | 0.1 |
| Expansion in MD at 100° C. | in % | 0 | 0 | −0.1 | 0 | −0.1 | −0.1 | 0.1 | 0 | 0 |
| Expansion in TD at 100° C. | in % | 0.1 | 0 | 0 | 0.1 | 0 | 0 | 0.1 | 0 | 0.1 |

TABLE 1-continued

|  | Ex. 1 | Ex. 2 | Ex. 3 | Ex. 4 | Ex. 5 | VB1 | VB2 | VB3 | VB4 |
|---|---|---|---|---|---|---|---|---|---|
| Standard viscosity | 735 | 741 | 708 | 733 | 737 | 699 | 620 | 737 | 740 |
| Transparency min. between 300 and 370 nm | 41 | 39 | 41 | 43 | 45 | 18 | 4 | 14 | 61 |
| Transparency min. between 390 and 400 nm | 13 | 12 | 14 | 14 | 14 | 6 | 12 | 5 | 21 |
| Note |  |  |  |  |  | * | ** |  |  |

\* 33% more tears in film than in Example 2
\*\* Strong gas emissions during preparation + many tears in film

The invention claimed is:

1. A greenhouse screen comprising strips of film material that are interconnected by a yarn system of transverse threads and longitudinal threads by means of knitting, warp-knitting or weaving process to form a continuous product, wherein at least some of the strips comprise a film in the form of a single- or multilayer polyester film wherein said film contains at least 1.0 wt. -% $SiO_2$-particles, and a maximum of 2.5 wt. -% $SiO_2$-particles, said $SiO_2$-particles having a particle size d50 of 5-7 μm; and the film has a spreading factor (transparency measured according to ASTM D-1003-61, Method A/transparency measured by the Clarityport) of at least 2 and not more than 8 and the film has a clarity of 18-40%.

2. The greenhouse screen according to claim 1, wherein said film has a total thickness of at least 10 micrometers and at the most 30 micrometers.

3. The greenhouse screen according to claim 1, wherein said film is composed of one base layer and two outer layers, the outer layers each contain less than 1.5% of the $SiO_2$ particles.

4. The greenhouse screen according to claim 1, wherein said film has a transmission of less than 40% in the wavelength range from 370 nm to 300 nm.

5. The greenhouse screen according to claim 1, wherein said film has a standard viscosity value of at least 700.

6. The greenhouse screen according to claim 1, wherein said film has a haze of 60-95%.

7. The greenhouse screen according to claim 1, wherein said film has a clarity of 18-35%.

8. The greenhouse screen according to claim 1, wherein said film has a transparency of 70-92%.

9. The greenhouse screen according to claim 1, wherein at least all of the outer layers contain between 0.3 wt.-% and 3 wt.-% of an organic UV-stabilizer based on the weight of the layer and the organic UV-stabilizer is selected from the group consisting of triazines, benzotriazoles or benzoxazinones.

10. The greenhouse screen according to claim 9, wherein the organic UV-stabilizer is 2-(4,6-diphenyl-1,3,5-triazin-2-yl) -5- (hexyl) oxy-phenol Tinuvin® 1577.

11. The greenhouse screen according to claim 1, wherein white coloring polymers, incompatible with the major component of polyester, is added in an amount of less than 0.3 wt.-% based on the weight of said film.

12. The greenhouse screen according to claim 1, wherein no layer in said film contains more than 1 wt.-% of calcium carbonate, apatite, other small silica particles with a size <3 micrometers, aluminium oxide, crosslinked polystyrene, crosslinked Poly-methyl-methacrylat (PMMA), zeolite, aluminium silicate, $TiO_2$ or $BaSO_4$ particles based on the weight of each layer.

13. The greenhouse screen according to claim 1, wherein said film is multilayered and contains at least one outer layer wherein the polyester in this outer layer has an isophthalic acid (IPA) content of 8-23 mol % IPA.

14. The greenhouse screen according to claim 1, wherein a gap is formed between said one or more strips of film material and the adjacent strip(s) of film, said gap permitting ventilation through said screen.

15. The greenhouse screen according to claim 1, wherein at least 10% of the strips of film material in the greenhouse screen comprise said single-or multilayer polyester film.

16. The greenhouse screen according to claim 1, wherein all strips of film material in the greenhouse screen are of said single- or multilayer polyester film.

17. The greenhouse screen according to claim 1, wherein at least 20% of the strips of film material in the greenhouse screen comprise said single-or multilayer polyester film.

18. The greenhouse screen according to claim 1, wherein at least 30% of the strips of film material in the greenhouse screen comprise said single-or multilayer polyester film.

19. The greenhouse screen according to claim 1, wherein at least 40% of the strips of film material in the greenhouse screen comprise said single-or multilayer polyester film.

20. The greenhouse screen according to claim 1, wherein at least 50% of the strips of film material in the greenhouse screen comprise said single-or multilayer polyester film.

* * * * *